UNITED STATES PATENT OFFICE.

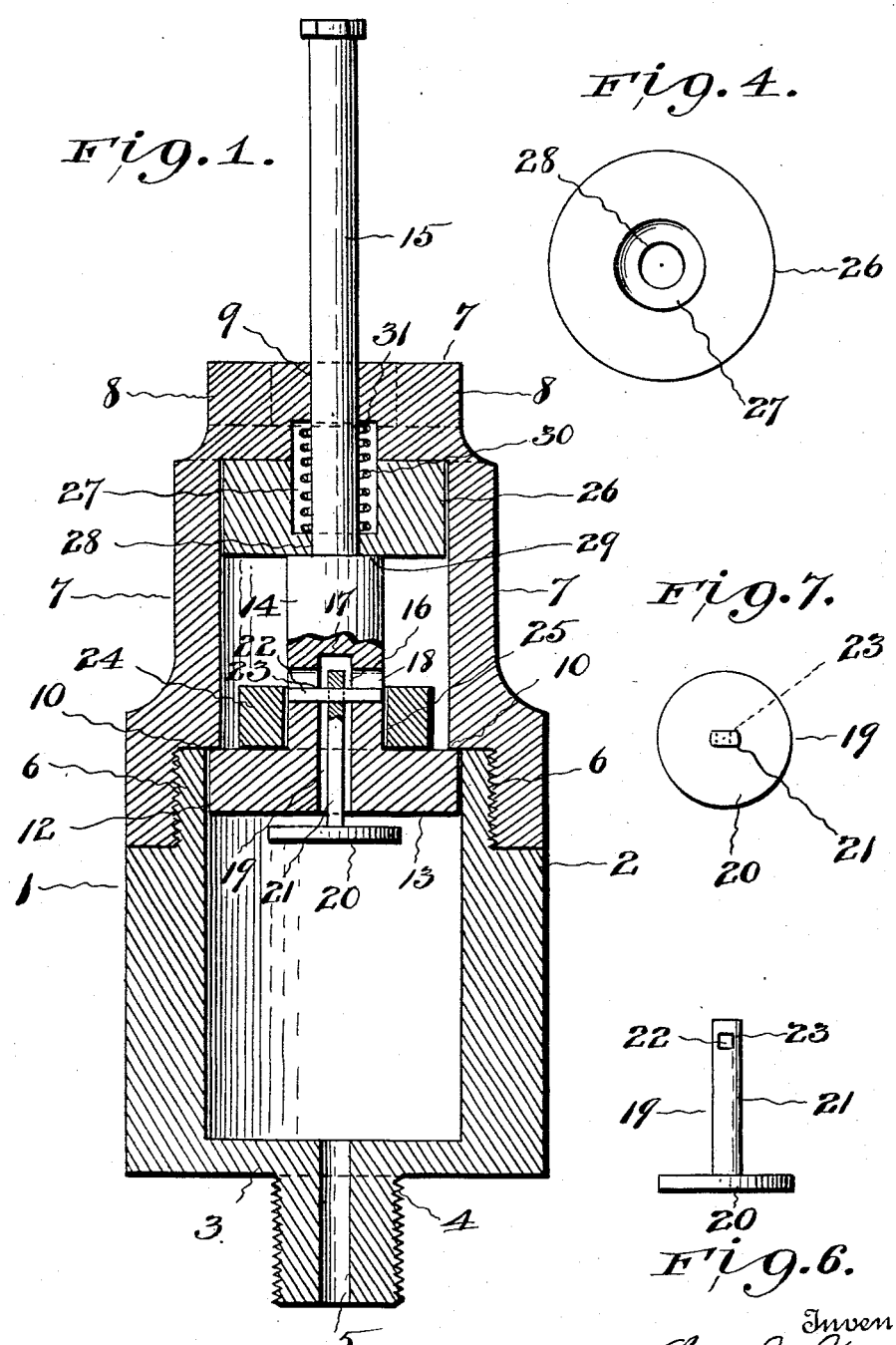

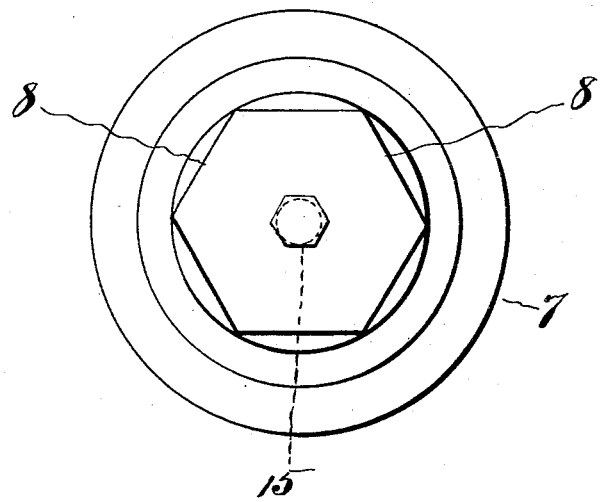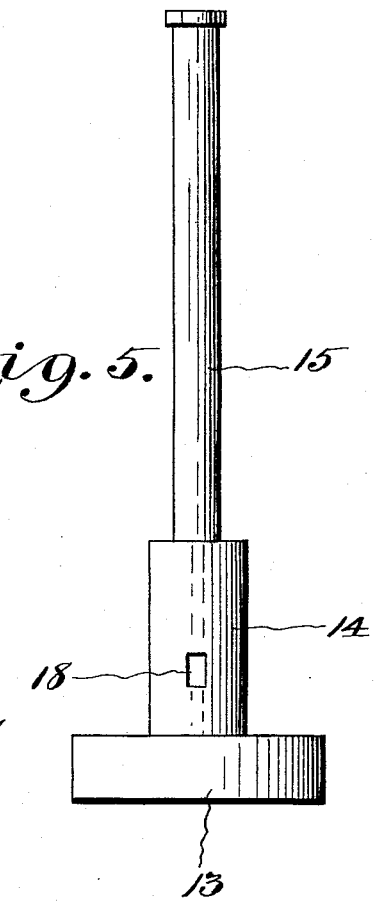

LOUIS N. VINCENT, OF PRESCOTT, ARIZONA, ASSIGNOR OF NINE-TWENTIETHS TO CHARLES A. CHAMBERS, OF PRESCOTT, ARIZONA.

GREASE-CUP.

1,167,861. Specification of Letters Patent. Patented Jan. 11, 1916.

Application filed August 6, 1914. Serial No. 855,401.

*To all whom it may concern:*

Be it known that I, LOUIS N. VINCENT, residing at Prescott, in the county of Yavapai and State of Arizona, a citizen of the United States, have invented certain new and useful Improvements in Grease-Cups; and I do hereby declare the following to be a full, clear, and exact description of the invention, such as will enable others skilled in the art to which it pertains to make and use the same.

My invention relates to improvements in grease cups particularly adapted for use on the moving parts of machinery, as for instance on the connecting rods of a locomotive.

The invention consists in the several features and combination of features as more fully hereinafter described and claimed.

It has for its object to provide a grease cup with means for automatically feeding grease, said means being operated by the movement of the part of the machinery on which the grease cup is mounted.

It further has for its object to provide means for supplementing the pressure on the grease caused by the weight of the follower.

It further has for its object to provide means for causing the follower to bear on the surface of the grease and automatically keep it under constant pressure.

It further has for its object to provide means whereby the feeding of the grease can be effected manually if it is so desired.

It further has for its object to provide reciprocal means for effecting the automatic feeding of the grease.

It further has for its object to provide means for automatically feeding air under the follower of the grease cup.

It further has for its object to provide means whereby the height of the grease in the cup can be ascertained without necessitating the opening of the cup.

It further has for its object to provide a grease cup which is simple, inexpensive and durable in construction and very effective and convenient when in use.

Referring to the drawings:—Figure 1 is a central vertical sectional view of my invention. Fig. 2 a top plan view. Fig. 3 a bottom plan view of the cover of the grease cup. Fig. 4 a top plan view of the spring pressed sleeve. Fig. 5 a side view in elevation of the follower and its stem. Fig. 6 a side view of the air valve. Fig. 7 a top plan view of the air valve.

In the drawings in which similar reference characters denote similar parts throughout the several views, 1 represents the grease cup, shown as cylindrical in form but which may be made in any desired shape or form, which comprises a body portion or grease receptacle 2 with a bottom 3 provided with a screwthreaded projection 4 having an outlet or feed hole 5 through which the grease is fed to the part to be lubricated. The upper end of the grease receptacle 2 is provided with exterior screwthreads 6 and is closed by a cover 7, which is screwed onto the screwthreads 6, provided with a hexagonal boss 8, having a hole 9 extending through said boss and cover, and an interior circular shoulder 10. A follower 12 is provided inside the grease cup receptacle 2, which may have any well known packing rings not shown, applied thereto to maintain a tight joint in connection with the said receptacle, said follower comprising a head 13, a circular projection 14 and a stem 15 extending upward from said projection.

The projection 14 of the follower 12 is provided with a circular vertical recess 16 which extends upward to a point 17 and 18 are square holes which extend laterally through the projection 14 and communicate with the recess 16. An air valve 19 is provided comprising a head 20 adapted to contact with the bottom of the head 13 of the follower and control the admission of air under said head of the follower, a stem 21 which fits loosely in the recess 16 and a square pin 22 which fits or is mounted in a square hole 23 in the stem 21 of the air valve and serves to retain the air valve loosely in its operative position. A weight 24 is provided having a hole 25 therethrough by which it is adapted to be mounted on the projection above the stem 15 of the follower and is designed to be reciprocated thereon between the top of the head of the follower and a sleeve 26 by the vibration of the moving part of the machinery on which the grease cup is mounted. It will be seen that as the follower moves downward, under the pressure of the weight or rather the hammering thereof, the extent of movement of the weight on the stem between the follower and the sleeve 26 will always remain the same. The sleeve 26, before referred to, has a socket 27 and an aperture 28 and is mounted on the stem 15 of the follower and seats on a shoulder 29 formed by the top of the projection 14 and a spiral spring 30 encircles the stem 15 and one end is mounted in the socket 27 while the other end is mounted in a recess 31 in the cover 7. The spiral spring 30 is for the purpose of constantly or at all times maintaining a spring pressure on the sleeve 26 and the follower 12 and thereby supplementing the pressure caused by the weight of the follower on the grease. The spring pressed sleeve 26 also serves as a yielding abutment for the weight 24 during its operation on the stem of the follower.

The several parts of the grease cup may be made of any desired size or shape to suit the requirements of use.

If it is desired to feed the grease when the cup is at rest it is only necessary to fill the grease receptacle of the cup full, place the follower on the surface of the grease and then by screwing the top downward the shoulder 10 will contact with the follower and grease will be forced out of the outlet hole 5 by the pressure of the said follower. The feed of the grease is regulated by changing the weight of the reciprocatory weight.

In operation the grease, follower and other parts are placed in the grease receptacle, the cover screwed tightly on and as the grease cup is vibrated or reciprocated by the motion of the moving part of the machinery on which it is mounted the weight is caused to reciprocate between the follower and the spring pressed sleeve and to knock or hammer against the follower which causes the grease to be expelled or fed from the grease receptacle through the feed hole 5 to the part to be lubricated.

I do not wish to be understood as limiting myself to the specific details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

What I claim is:—

1. In a grease cup, a grease receptacle, a follower and a valve loosely mounted and freely movable up and down within the follower, having a stem loosely fitting the follower, said valve admitting air through said follower to the grease receptacle, substantially as described.

2. In a grease cup, a grease receptacle, a cover, a follower, spring means for pressing said follower downward, a reciprocatory weight, and a valve within the follower having a stem provided with laterally extending means for loosely mounting it in said follower, said valve controlling the admission of air through said follower to the grease receptacle, substantially as described.

3. In a grease cup, a grease receptacle, a follower, a reciprocatory weight, means for supplementing the pressure of the follower on the grease and a valve within the follower having a stem provided with laterally extending means for loosely mounting it in said follower, said valve admitting air through the follower to the grease receptacle, substantially as described.

4. In a grease cup, a grease receptacle, a cover, a follower having a stem passing through said cover, a reciprocatory weight, a spring pressed sleeve mounted on said stem and loosely mounted means for admitting air through said follower to said grease receptacle, substantially as described.

5. In a grease cup, a grease receptacle, a cover, a follower having a stem passing through said cover, a reciprocatory weight, a sleeve mounted on said stem, a spring for imparting pressure to said sleeve and loosely mounted means for admitting air through said follower to said grease receptacle, substantially as described.

6. In a grease cup, a grease receptacle, a cover, a follower having a loosely mounted valve for controlling the admission of air therethrough to the grease receptacle, a stem having a reciprocatory weight and a spring pressed sleeve for imparting pressure to said follower, substantially as described.

7. In a grease cup, a grease receptacle, a cover having an annular shoulder, a follower having a stem and limited in its upward movement by said shoulder, a loosely mounted valve in said follower controlling the admission of air therethrough to the grease receptacle, a reciprocatory weight on said follower, a sleeve on the stem of the follower and a spring between the sleeve and cover, substantially as described.

8. In a grease cup, a cover, a follower having a projection, a stem and a valve, a reciprocatory weight mounted loosely on said projection, a sleeve mounted on said stem, and a spring encircling said stem between the cover and the sleeve, substantially as described.

9. In a grease cup, a cover, a follower having a projection, a stem, a vertical recess, lateral recesses and a valve, said valve comprising a stem mounted in said vertical recess, a pin mounted in the lateral recesses and a head, a spring pressed sleeve mounted on the stem of the follower and a reciprocatory weight mounted on the projection of the follower, substantially as described.

In testimony whereof I affix my signature in the presence of two witnesses.

LOUIS N. VINCENT.

Witnesses:
CHAS. A. CHAMBERS,
CLARE H. OLEEN.

Copies of this patent may be obtained for five cents each, by addressing the "Commissioner of Patents, Washington, D. C."